United States Patent
Lee et al.

(10) Patent No.: US 9,174,265 B2
(45) Date of Patent: Nov. 3, 2015

(54) RECHARGEABLE BATTERY AND MANUFACTURING METHOD OF THE SAME

(75) Inventors: Jae-Wook Lee, Yongin-si (KR);
Yong-Woo Kim, Yongin-si (KR);
Sang-Shin Choi, Yongin-si (KR);
Jin-Hwan Chang, Yongin-si (KR);
Jeong-Won Oh, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 546 days.

(21) Appl. No.: 13/158,676

(22) Filed: Jun. 13, 2011

(65) Prior Publication Data

US 2012/0094160 A1 Apr. 19, 2012

(30) Foreign Application Priority Data

Oct. 13, 2010 (KR) ........................ 10-2010-0099928

(51) Int. Cl.
| | | |
|---|---|---|
| *H01M 2/00* | (2006.01) | |
| *H01M 10/0587* | (2010.01) | |
| *B21D 51/30* | (2006.01) | |
| *B21D 51/44* | (2006.01) | |
| *H01M 2/02* | (2006.01) | |
| *H01M 2/04* | (2006.01) | |
| *H01M 2/18* | (2006.01) | |
| *H01M 10/04* | (2006.01) | |
| *H01M 10/647* | (2014.01) | |
| *H01M 10/6551* | (2014.01) | |
| *H01M 10/613* | (2014.01) | |

(52) U.S. Cl.
CPC ............... *B21D 51/30* (2013.01); *B21D 51/44* (2013.01); *H01M 2/0217* (2013.01); *H01M 2/0426* (2013.01); *H01M 2/18* (2013.01); *H01M 10/0431* (2013.01); *H01M 10/0587* (2013.01); *H01M 10/613* (2015.04); *H01M 10/647* (2015.04); *H01M 10/6551* (2015.04); *Y10T 29/4911* (2015.01)

(58) Field of Classification Search
None
See application file for complete search history.

(56) References Cited

U.S. PATENT DOCUMENTS

| | | | |
|---|---|---|---|
| 4,626,157 A | | 12/1986 | Franek et al. |
| 4,965,149 A | * | 10/1990 | Ashihara et al. ............... 429/168 |
| 5,556,722 A | * | 9/1996 | Narukawa et al. ............ 429/163 |

(Continued)

FOREIGN PATENT DOCUMENTS

| | | |
|---|---|---|
| JP | 3051814 U | 6/1998 |
| JP | 3067234 U | 12/1999 |

(Continued)

OTHER PUBLICATIONS

Korean Office action issued by KIPO on Jan. 27, 2012, corresponding to KR 10-2010-0099928 and request for Entry attached herewith.

(Continued)

*Primary Examiner* — Patrick Ryan
*Assistant Examiner* — Lucas J O'Donnell
(74) *Attorney, Agent, or Firm* — Robert E. Bushnell, Esq.

(57) ABSTRACT

A rechargeable battery having an electrode assembly formed by depositing/spiral-winding an positive electrode and a negative electrode on respective surfaces of a separator; a can including a pipe having a side seam portion to enclose the electrode assembly and a bottom plate bonded to a first opening of the pipe by a bottom seam portion to close and seal the first opening and facing an end portion of the electrode assembly; and a cap assembly bonded to a second opening of the pipe formed at the other side of the bottom plate to close and seal the second opening.

19 Claims, 9 Drawing Sheets

(56) References Cited

U.S. PATENT DOCUMENTS

| | | | |
|---|---|---|---|
| 6,228,530 B1* | 5/2001 | Dokyu et al. | 429/168 |
| 7,790,313 B2 | 9/2010 | Lee | |
| 2005/0042517 A1 | 2/2005 | Kim | |
| 2006/0024578 A1* | 2/2006 | Lee | 429/208 |
| 2006/0083981 A1 | 4/2006 | Mori et al. | |
| 2007/0099076 A1* | 5/2007 | Okuda | 429/162 |
| 2009/0206096 A1* | 8/2009 | Hirotsu et al. | 220/612 |

FOREIGN PATENT DOCUMENTS

| | | |
|---|---|---|
| JP | 2002-198011 | 7/2002 |
| JP | 2005310579 A * | 11/2005 |
| JP | 2006-320918 A | 11/2006 |
| KR | 1020060010482 | 2/2006 |
| KR | 10-0736511 | 6/2007 |
| KR | 10-2008-0012872 | 2/2008 |
| WO | WO 2010113270 A1 * | 10/2010 |

OTHER PUBLICATIONS

Korean Notice of Allowance issued on Aug. 31, 2012 by KIPO in connection with Korean Patent Application Serial No. 10-2010-0099928 and Request for Entry of the Accompanying Office Action attached herewith.

* cited by examiner

RECHARGEABLE BATTERY AND MANUFACTURING METHOD OF THE SAME

CLAIM OF PRIORITY

This application makes reference to, incorporates the same herein, and claims all benefits accruing under 35 U.S.C. §119 from an application earlier filed in the Korean Intellectual Property Office on Oct. 13, 2010 and there duly assigned Serial No. 10-2010-0099928.

BACKGROUND OF THE INVENTION

1. Field of the Invention

The described technology relates generally to a rechargeable battery.

2. Description of the Related Art

Unlike primary batteries, rechargeable batteries can be repeatedly charged and discharged. Representative rechargeable batteries include a nickel-hydrogen battery, a lithium battery, and a lithium ion battery, and are manufactured in a package form to be widely used in portable electronic apparatuses such as a cellular phone, a notebook computer, and a camcorder.

A rechargeable battery includes an electrode assembly in which a positive electrode and a negative electrode are stacked and spirally wound in the form of a jelly roll with a separator interposed therebetween, a can receiving the electrode assembly therein together with an electrolyte solution, and a cap assembly sealing a top opening of a can.

The can is made of aluminum or an aluminum alloy by using a mold, and has a cylindrical shape or an angular shape formed through a drawing process using a sheet of metal. The drawing process includes a multi-step process to form the sheet into the can. Accordingly, the multi-step drawing process complicates the manufacturing process of the can such that the productivity may be deteriorated, and molds for each step are required such that production cost of the can is increased.

The above information disclosed in this Related Art section is only for enhancement of understanding of the background of the described technology and therefore it may contain information that does not form the prior art that is already known in this country to a person of ordinary skill in the art.

SUMMARY OF THE INVENTION

Aspects of the present invention provide for a manufacturing method of a rechargeable battery that increases productivity of the can and reduces production cost through a simple process.

Also, aspects of the present invention provide for a rechargeable battery including the can manufactured by the above-described manufacturing method.

A rechargeable battery according to an exemplary embodiment may include: an electrode assembly formed by depositing/spiral-winding an positive electrode and a negative electrode on respective surfaces of a separator; a can including a pipe having a side seam portion to enclose the electrode assembly and a bottom plate bonded to a first opening of the pipe by a bottom seam portion to close and seal the first opening and facing an end portion of the electrode assembly; and a cap assembly bonded to a second opening of the pipe formed at the other side of the bottom plate to close and seal the second opening.

The pipe may include a pair of narrow surfaces facing each other and a pair of wide surfaces facing each other and vertically connecting both side portions of a pair of narrow surfaces, and the bottom plate may be formed of a rectangular plate bonded to end portions of the narrow surfaces and the wide surfaces.

The electrode assembly may include a plane portion facing a pair of wide surfaces, and a convex portion facing a pair of narrow surfaces.

The rechargeable battery may further include an inserting member inserted into a space formed between a corner vertically connecting the wide surface and the narrow surface of the pipe, and the convex portion of the electrode assembly.

The inserting member may include a concave portion close to the convex portion, a first plane portion close to the narrow surface, and a second plane portion close to the wide surface and formed vertical with respect to the first plane portion.

The side seam portion may be formed by overlapping and seam-welding a bent portion that is bent toward the wide surface from the narrow surface with the end portion of the wide surface in the corner of the pipe.

The inserting member may include a concave portion close to the convex portion, a first plane portion close to the narrow surface, a first sub-plane portion close to the bent portion and formed vertical with respect to the first plane portion, and a second sub-plane portion formed with a step for the first sub-plane portion and close to the wide surface.

The bottom seam portion may be formed by rolling and bonding a flange formed at an end portion of the pipe and a curl of the bottom plate, and may be formed at a lower end portion corresponding to the inner part of the pipe.

The electrode assembly may form a space with the bottom plate, and is supported by the bottom seam portion.

The bottom seam portion may be formed by rolling and bonding a flange formed at the end portion of the pipe and a curl of the bottom plate, and may be positioned outside the pipe.

The electrode assembly may be supported by the bottom plate.

The bottom seam portion may be formed by folding a flange formed at an end portion of the pipe and a curl of the bottom plate, and may be positioned at a lower end portion corresponding to the inside of the pipe.

The electrode assembly may form a space with the bottom plate, and is supported by the bottom seam portion.

A rechargeable battery manufacturing method according to an exemplary embodiment may include: slitting a metal sheet into a unit sheet of a predetermined size; forming the unit sheet into a pipe of a cylinder having a side seam portion by rolling the unit sheet, and overlapping and bonding both ends thereof; forming the cylinder pipe into a rectangular pipe; forming a flange by deforming one end portion of the rectangular pipe; forming a can of a rechargeable battery having a bottom seam portion where the flange and the curl of the bottom plate are bonded; and inserting the electrode assembly into the can and combining the cap assembly to the can by connecting the cap assembly to the electrode assembly.

The forming a flange may form the flange to be narrow at the one end portion of the rectangular pipe.

The forming a can may form the bottom seam portion formed by rolling the flange and the curl at the lower end corresponding to the inside of the can.

The inserting the electrode assembly into the can and combining the cap assembly to the can may support the one end of the electrode assembly to the bottom seam portion.

The forming a flange may form the flange to be wide at one end portion of the rectangular pipe.

The forming a can may form the bottom seam portion formed by rolling the flange and the curl outside the can.

The inserting the electrode assembly into the can and combining the cap assembly to the can may support one end of the electrode assembly by the bottom plate.

The forming a flange may form the flange by folding the flange from one end portion of the rectangular pipe to the inside thereby being directed toward the other end portion.

The forming a can may form the bottom seam portion formed by folding the flange and the curl of the bottom plate inside the can.

As described above, according to an exemplary embodiment, the metal sheet is slit to form the pipe, and the can is produced through the process of bonding the bottom plate to the pipe such that the manufacturing process may be simplified. Accordingly, the productivity of the can may be increased, and the production cost of the rechargeable battery may be reduced.

The rectangular corner of the pipe and the electrode assembly form the space therebetween such that the amount of electrolyte solution per unit cell may be increased. Accordingly, the capacity of the rechargeable battery may be increased. Also, when inserting the inserting member into the corner space, movement of the electrode assembly may be prevented in the can, and the strength of the rechargeable battery may be enhanced.

The side seam portion may be formed by overlapping the bent portion of the narrow surface and the end portion of the wide surface at the corner in the pipe such that damage to the electrode assembly may be prevented. The bottom plate is bonded to the pipe by the bottom seam portion and protrudes outside the pipe such that the heat radiating performance of the rechargeable battery may be improved.

When the bottom seam portion is positioned inside the pipe, the electrode assembly may be supported by the bottom seam portion such that the electrolyte solution flows down the electrode assembly to the bottom plate. Accordingly, the capacity of the rechargeable battery and the heat radiating performance may be improved.

When the bottom seam portion is positioned outside the pipe and a module may be formed by connecting the unit cells of the rechargeable battery, an interval is formed between the unit cells. Accordingly, air flow occurs between the unit cells such that the heat radiating performance of the unit cells may be improved.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
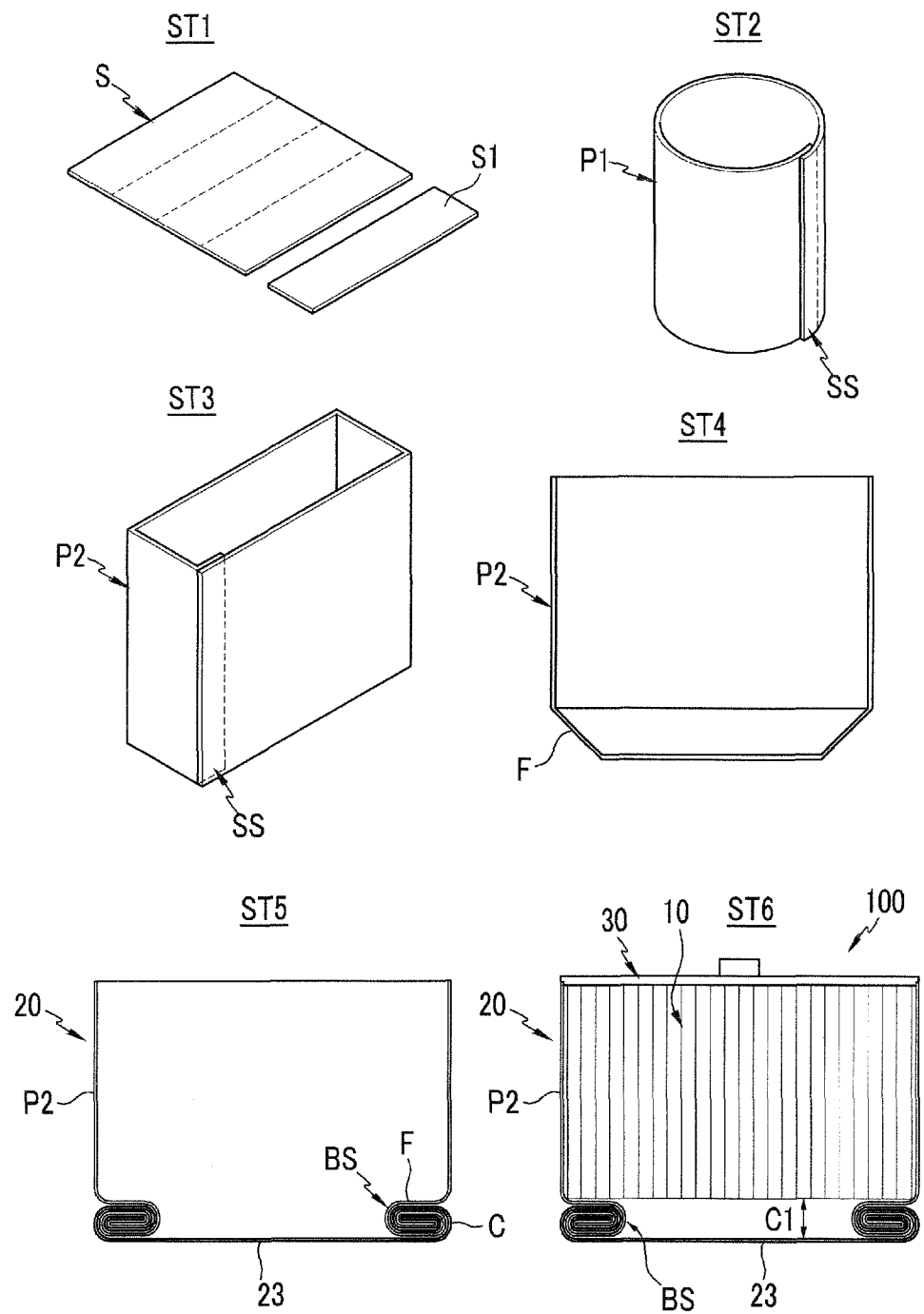
FIG. 1 shows a manufacturing method of a rechargeable battery in order of procedure according to the first exemplary embodiment.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Recognizing that sizes and thicknesses of constituent members shown in the accompanying drawings are arbitrarily given for better understanding and ease of description, the present invention is not limited to the illustrated sizes and thicknesses.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. Alternatively, when an element is referred to as being "directly on" another element, there are no intervening elements present.

In order to clarify the present invention, elements extrinsic to the description are omitted from the details of this description, and like reference numerals refer to like elements throughout the specification.

In several exemplary embodiments, constituent elements having the same configuration are representatively described in a first exemplary embodiment by using the same reference numeral and only constituent elements other than the constituent elements described in the first exemplary embodiment will be described in other embodiments.

Figure 2:
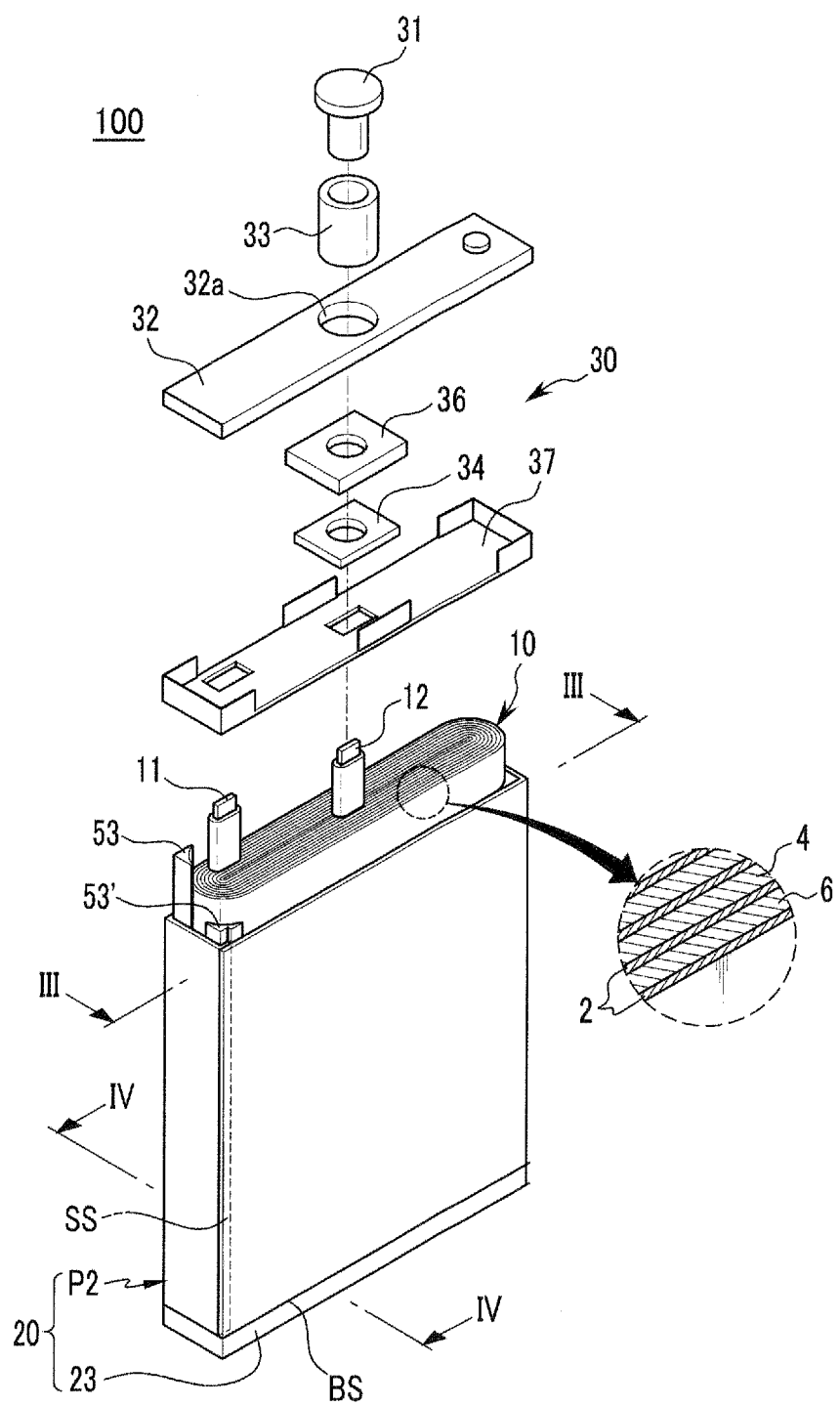
FIG. 2 is an exploded perspective view of a rechargeable battery according to the first exemplary embodiment.

FIG. 1 shows a manufacturing method of a rechargeable battery in order of procedure according to the first exemplary embodiment, and FIG. 2 is an exploded perspective view of a rechargeable battery according to the first exemplary embodiment.

Referring to FIG. 1 and FIG. 2, a manufacturing method of a rechargeable battery according to the first exemplary embodiment includes processes for manufacturing a can 20, inserting an electrode assembly 10 connected to a cap assembly 30 in the can 20, and coupling the cap assembly 30 to the can 20.

For example, the rechargeable battery manufacturing method may include a slitting step ST1, a forming/side-seaming step ST2, a forming step ST3, a necking/flanging step ST4, a bottom-seaming step ST5, and an inserting/combining step ST6.

Here, the slitting step ST1, the forming/side-seaming step ST2, the forming step ST3, the necking/flanging step ST4, and the bottom-seaming step ST5 are included in the manufacturing process of the can 20. The electrode assembly 10 and the cap assembly 30 may be manufactured by disclosed processes (a description of which is omitted). Accordingly, the configuration of the electrode assembly 10 and the cap assembly 30 will be described, and the description of the manufacturing process is omitted.

Firstly, the manufacturing process and the configuration of the can 20 will be described. In the slitting step ST1, a metal sheet S of a large area is slit into unit sheets S1 of a predetermined size. The metal sheet S may be formed of aluminum, an aluminum alloy, or steel.

In the forming/side-seaming step ST2, the unit sheet S1 may be rolled into a cylinder shape and both ends thereof are overlapped and welded by seam welding. The unit sheet S1 may be formed into a pipe P1 of a cylindrical shape having openings formed at both sides. The pipe P1 has side seam portion SS.

In the forming step ST3, the cylindrical pipe P1 may be formed into a rectangular pipe P2. In the rechargeable battery, when the can is formed as a cylinder, the forming step ST3 may be omitted in the manufacturing process (not shown).

In the necking/flanging step ST4, one end portion of the rectangular pipe P2, for example, the lower end portion, may be deformed thereby being formed into a flange F. For example, in the necking/flanging step ST4, the flange F may be formed to be narrower at one end portion of the pipe P2 than the pipe P2.

In the bottom seaming step ST5, the flange F of the pipe P2 and the curl C of a bottom plate 23 may be wound and combined to form a bottom seam portion BS. Accordingly, the pipe P2 and the bottom plate 23 are formed into the can 20 applied to the rechargeable battery 100. The can 20 has the bottom seam portion BS.

The flange F is narrower than the pipe P2 such that the bottom seaming step ST5 including forming the bottom seam portion BS where the curl C of the bottom plate 23 and the flange F are combined inside the can 20. That is, the bottom seam portion BS is protruded inside the can 20.

In the inserting/combining step ST6, the electrode assembly 10 connected to the cap assembly 30 may be inserted into the can 20 and the cap assembly 30 is combined to the can 20. The cap assembly 30 may be welded to the can 20. That is, the cap plate 32 of the cap assembly 30 that will be described later is welded to the pipe P2 of the can 20.

The bottom seam portion BS protrudes inside the can 20 such that the electrode assembly 10 that is inserted into the can 20 is close thereto, thereby being supported by the bottom seam portion BS. That is, a space having an interval C1 may be formed between the electrode assembly 10 and the bottom plate 23 (referring to FIG. 1 and FIG. 3).

Figure 3:
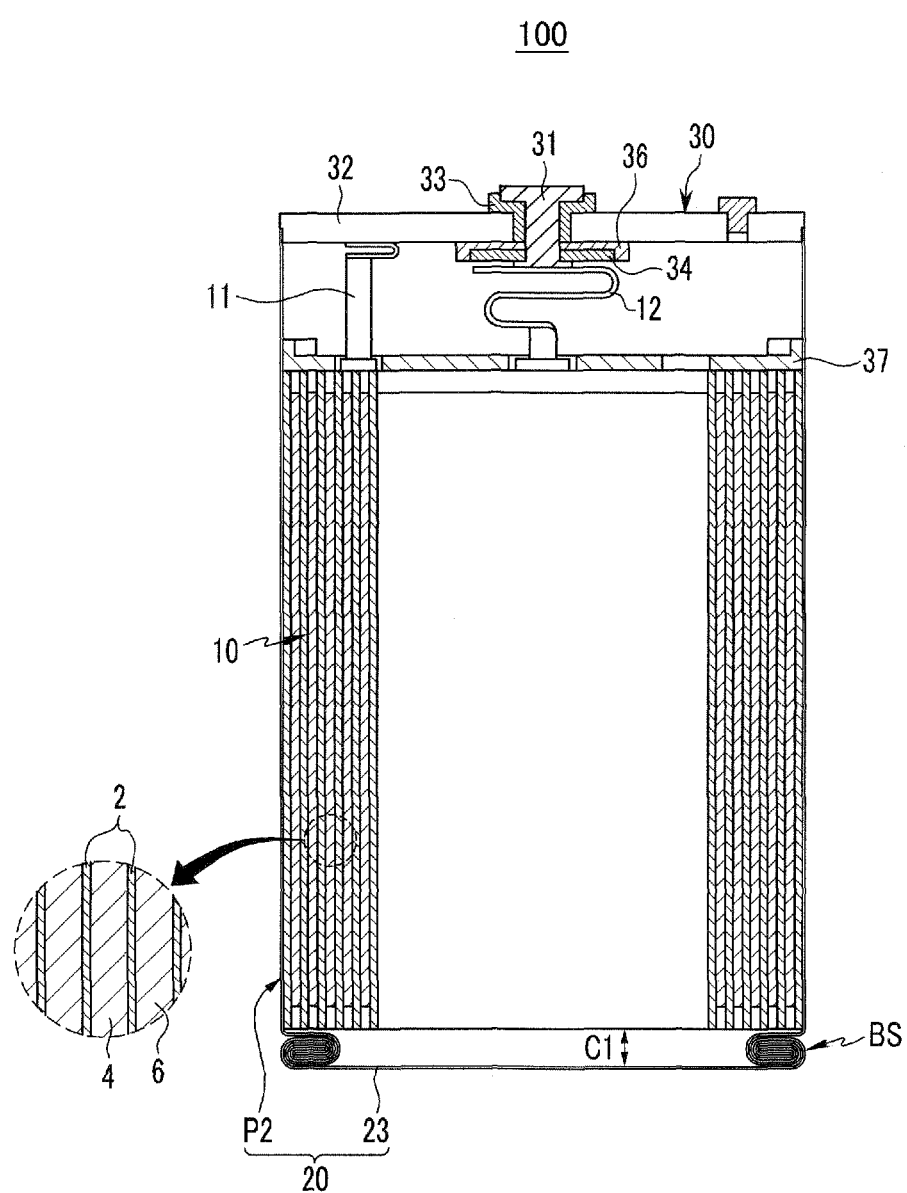
FIG. 3 is a cross-sectional view taken along line III-III in a state in which the rechargeable battery of FIG. 2 is assembled.

FIG. 3 is a cross-sectional view taken along line III-III in a state in which the rechargeable battery of FIG. 2 is assembled. The rechargeable battery 100 shown in FIG. 2 and FIG. 3 is the first exemplary embodiment manufactured by the manufacturing method of FIG. 1.

The rechargeable battery 100 of the first exemplary embodiment includes an electrode assembly 10, a can 20 receiving the electrode assembly 10 with an electrolyte solution, and a cap assembly 30 sealing the opening that may be formed at the upper side of the can 20.

The electrode assembly 10 may be formed by spiral-winding it in the shape of a jelly roll by depositing a positive electrode 4 and a negative electrode 6 with a separator 2 interposed therebetween. In the electrode assembly 10, the positive electrode 4 is connected to a positive electrode lead 11 and the negative electrode 6 is connected to a negative electrode lead 12.

The can 20 is formed for the electrode assembly 10 to be inserted through the opening formed at the upper side, and is formed as a conductor to serve as an electrode terminal. For example, the can 20 is connected to the positive electrode lead 11 thereby functioning as the positive electrode terminal. Here, the electrode terminal 31 provided at the cap assembly 30 may be connected to the negative electrode lead 12 thereby acting as the negative electrode terminal. In contrast, the can may function as the negative electrode terminal, and the electrode terminal may function as the positive electrode terminal (not shown).

Also, the can 20 is formed by bonding the pipe P2 having a side seam portion SS and a bottom plate 23. For example, the pipe P2 and the bottom plate 23 are bonded by the bottom seam portion BS. The pipe P2 may be formed with the rectangular shape thereby enclosing the electrode assembly 10. The bottom plate 23 may be bonded to the lower opening of the pipe P2, thereby closing and sealing the lower opening and facing the lower end portion of the electrode assembly 10 (referring to FIG. 3).

The cap assembly 30 may be bonded to the upper opening of the pipe P2 formed at the upper side of the bottom plate, 23 thereby closing and sealing the upper opening (referring to FIG. 3). For example, the cap assembly 30 may include a cap plate 32 fixed to the upper opening of the can 20, an electrode terminal 31 inserted into the terminal hole 32a of the cap plate 32 with an insulating gasket 33 interposed therebetween, a terminal plate 34 electrically connected to the lower portion of the electrode terminal 31, an insulating plate 36 disposed between the cap plate 32 and the terminal plate 34, and an insulating case 37 insulating the electrode assembly 10 and the cap assembly 30. The insulating gasket 33 electrically insulates the electrode terminal 31 and the cap plate 32, and the insulating plate 36 electrically insulates the terminal plate 34 and the cap plate 32.

The positive electrode lead 11 connected to the positive electrode 4 may be welded to the inner surface of the cap plate 32 such that the cap plate 32 and the can 20 act as the positive electrode terminal. The negative electrode lead 12 connected to the negative electrode 6 is welded to the lower surface of the terminal plate 34 such that the electrode terminal 31 acts as the negative electrode terminal.

Figure 4:
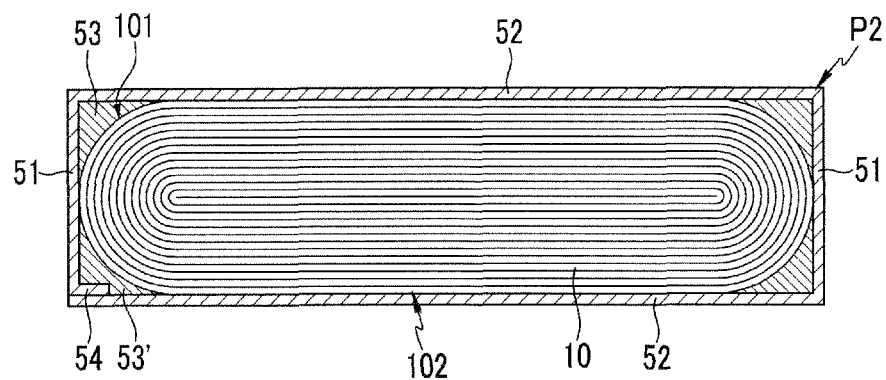
FIG. 4 is a cross-sectional view taken along line IV-IV in a state in which the rechargeable battery of FIG. 2 is assembled.

FIG. 4 is a cross-sectional view taken along line VI-VI in a state in which the rechargeable battery of FIG. 2 is assembled. Referring to FIG. 4, the pipe P2 of the rectangular shape includes a pair of narrow surfaces 51 facing each other and a pair of wide surfaces 52 facing each other and connected vertically to both ends of the narrow surfaces 51. Accordingly, the bottom plate 23 is formed with a rectangular plate shape bonded to the end portion of the narrow surfaces 51 and the wide surfaces 52 (referring to FIG. 2 and FIG. 3).

The electrode assembly 10 may include a convex portion 101 (i.e., convex curved portion) facing a pair of narrow surfaces 51 and a plane portion 102 facing a pair of wide surfaces 52. When inserting the electrode assembly 10 into the can 20, a cavity is formed between the electrode assembly 10 and the pipe P2. That is, a cavity may be formed between the corner vertically connecting the narrow surface 51 and the wide surface 52, and has a convex portion 101.

The space of the corner may be maintained in the rechargeable battery 100 as it is, or may be filled with an inserting member 53. The space of the corner may increase the capacity of the rechargeable battery 100 by increasing the capacity for the electrolyte solution.

Figure 5:
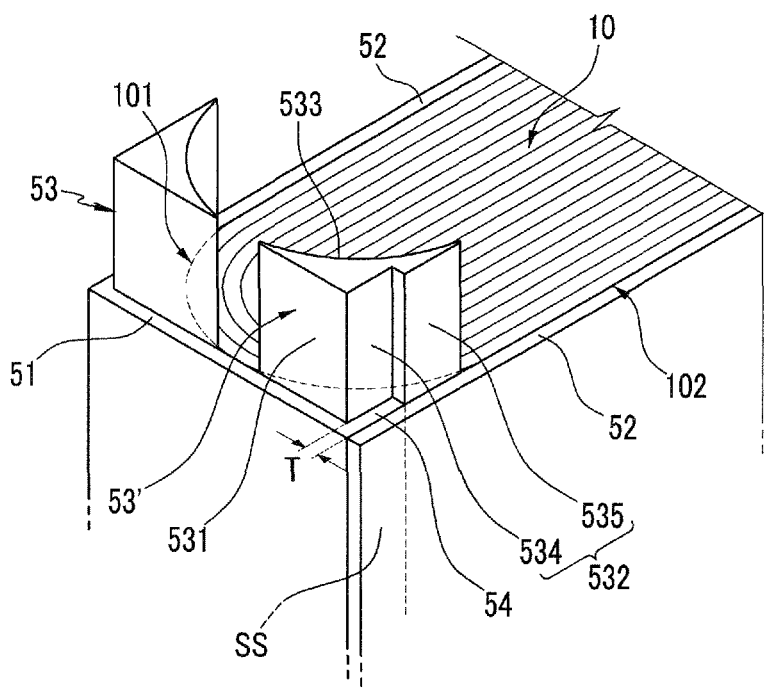
FIG. 5 is a partial perspective view of a corner of a rectangular pipe in the rechargeable battery of FIG. 2.

FIG. 5 is a partial perspective view of a corner of a rectangular pipe in the rechargeable battery of FIG. 2. Referring to FIG. 5, the inserting member 53 may be inserted to four corner spaces of the pipe P2 thereby supporting the narrow surfaces 51 and the wide surfaces 52 of the pipe P2, and the convex portions 101 of the electrode assembly 10. The inserting member 53 prevents the movement of the electrode assembly 10 in the pipe P2, and also improves the mechanical strength of the rechargeable battery 100.

For example, each inserting member 53 includes a concave portion 533 (i.e., concave curved portion) close to the convex portion 101 of the electrode assembly 10, a first plane portion 531 close to the narrow surface 51 of the pipe P2, and a second plane portion 532 close to the wide surface 52 and formed vertically to the first plane portion 531.

The side seam portion SS of the pipe P2 may be formed by overlapping and seam-welding a bent portion 54 curved toward the wide surface 52 at the narrow surface 51 to the end portion of the wide surface 52 in the corner of the pipe P2. Accordingly, the side seam portion SS may be formed with the structure that protrudes inside the pipe P2 at the corner.

An inserting member 53' that may be positioned at the side seam portion SS among the inserting members 53 may further form a step structure at the second plane portion 532 compared with the inserting member 53 positioned at the other corner.

That is, in the inserting member 53', the second plane portion 532 may include a first sub-plane portion 534 close to the bent portion 54 and formed vertical to the first plane portion 531, and a second sub-plane portion 535 close to the wide surface 52 having the step for the first sub-plane portion 534.

The first and second sub-plane portions 534 and 535 have the step corresponding to the thickness T of the bent portion 54. The step of the first and second sub-plane portions 534 and 535 receives the bent portion 54 of the thickness T such that surface contact between the concave portion 533 and the convex portion 101 is possible, and tight support of the electrode assembly 10 is possible in the pipe P2.

Figure 6:
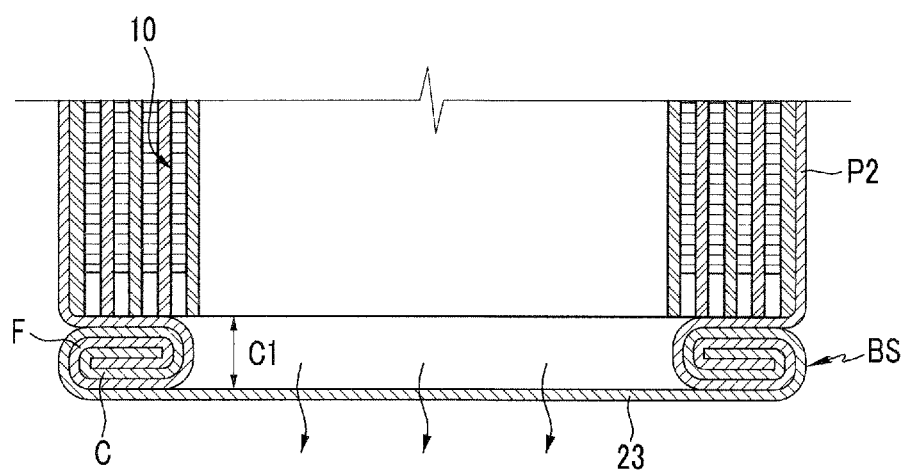
FIG. 6 is a cross-sectional view in a state in which the rectangular pipe and the bottom plate of FIG. 2 are assembled.

FIG. 6 is a cross-sectional view in a state in which the rectangular pipe and the bottom plate of FIG. 2 are assembled. Referring to FIG. 6, the bottom seam portion BS is formed by rolling and bonding the flange F formed at the end portion of the pipe P2 and the curl C of the bottom plate 23. Here, the flange F is narrower than the pipe P2 such that the bottom seam portion BS may be formed in the pipe P2.

The can 20 formed by the bonding of the pipe P2 and the bottom plate 23 receives the inserted electrode assembly 10, and the electrode assembly 10 is disposed at the bottom seam portion BS. The bottom seam portion BS supports the electrode assembly 10. Accordingly, the bottom seam portion BS forms a space having the interval C1 between the electrode assembly 10 and the bottom plate 23.

The bottom plate 23 may be bonded to the pipe P2 thereby being protruded in the lower direction of the pipe P2 such that the heat radiating performance of the rechargeable battery 100 may be improved compared with a structure in which the bottom plate 23 is concave to the inside. Also, the electrolyte solution flows down at the space between the electrode assembly 10 and the bottom plate 23 such that the heat radiating performance and the capacity of the rechargeable battery 100 may be further improved through the electrolyte solution and the bottom plate 23.

Figure 7:
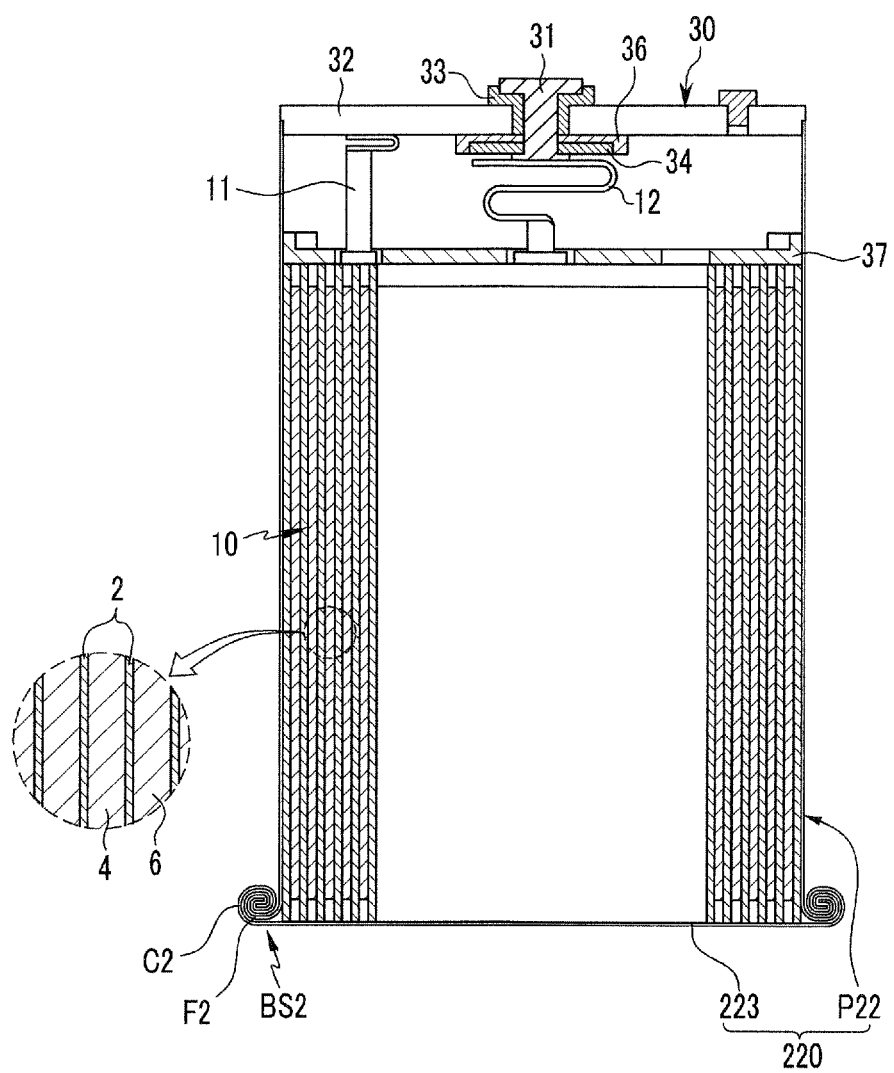
FIG. 7 is a cross-sectional view of a rechargeable battery according to the second exemplary embodiment.
Figure 8:
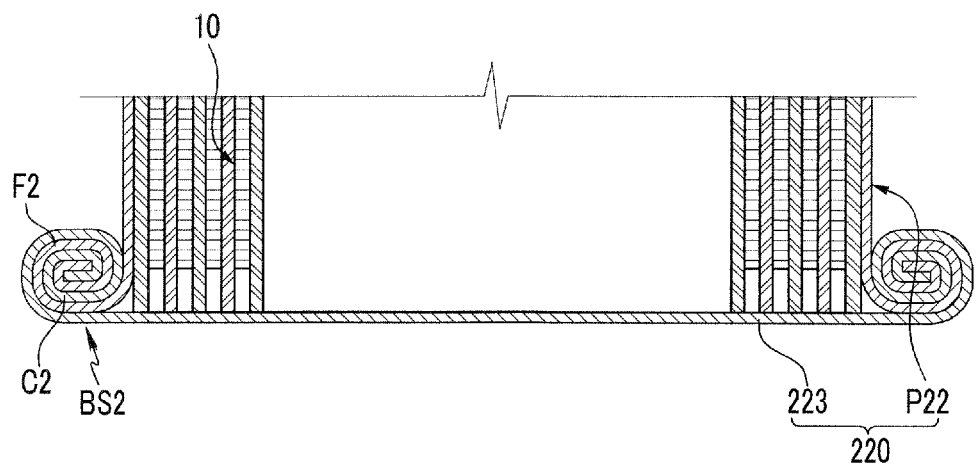
FIG. 8 is a cross-sectional view in a state in which the rectangular pipe and the bottom plate of FIG. 7 are assembled.

FIG. 7 is a cross-sectional view of a rechargeable battery 200 according to the second exemplary embodiment, and FIG. 8 is a cross-sectional view in a state in which a rectangular pipe P22 and a bottom plate 223 of FIG. 7 are assembled.

Referring to FIG. 1, FIG. 7, and FIG. 8, in the rechargeable battery manufacturing method, the necking/flanging step may widen the flange F2 at one end portion of the pipe P22. The bottom seaming step rolls and bonds the flange F2 of the pipe P22 and the curl C2 of the bottom plate 223 to form the bottom seam portion BS2.

Accordingly, the pipe P22 and the bottom plate 223 form a can 220 applied to the rechargeable battery 200. The flange F2 is wider than the pipe P22 such that the bottom seaming step forming the bottom seaming portion BS2 where the curl C2 of the bottom plate 223 and the flange F2 are bonded is formed outside the can 220. If the electrode assembly 10 is inserted to the can 220 through the inserting/combining step, the electrode assembly 10 is supported by the bottom plate 223.

Figure 9:
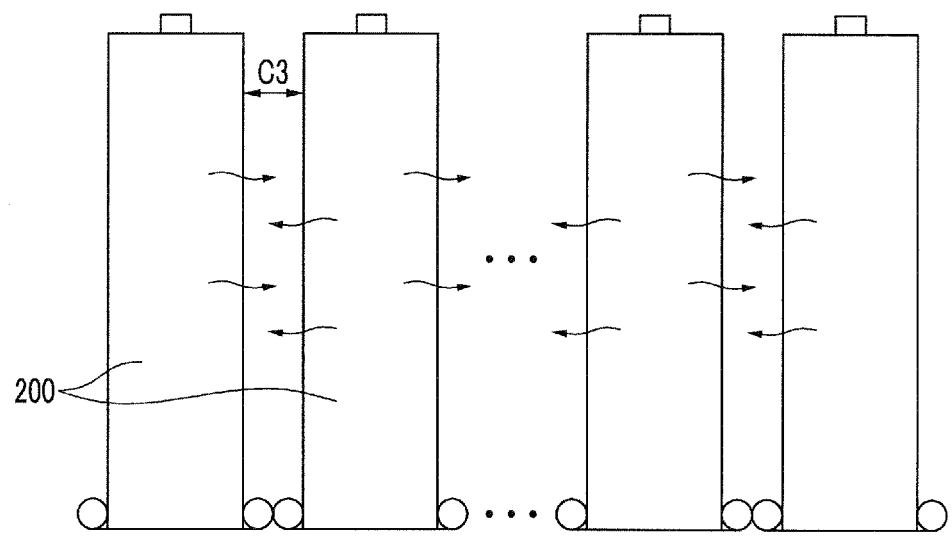
FIG. 9 is a schematic diagram of a rechargeable battery module in which the rechargeable battery of FIG. 7 is disposed.

FIG. 9 is a schematic diagram of a rechargeable battery module M in which the rechargeable battery 200 of FIG. 7 is disposed. Referring to FIG. 9, the bottom seam portion BS2 is positioned outside the pipe P22 such that the interval C3 is formed between the unit cells when connecting the unit cells of the rechargeable battery 200 to form the module M). The interval C3 allows air flow between the unit cells of the rechargeable battery 200 such that the heat radiating performance of the unit cells may be improved.

The rechargeable battery 100 of the first exemplary embodiment may be effectively used in a position where sufficient space is provided in the upper and lower directions. In contrast, the rechargeable battery 200 of the second exemplary embodiment may be effectively used in a position where sufficient space is provided in the right and left connection directions.

Figure 10:
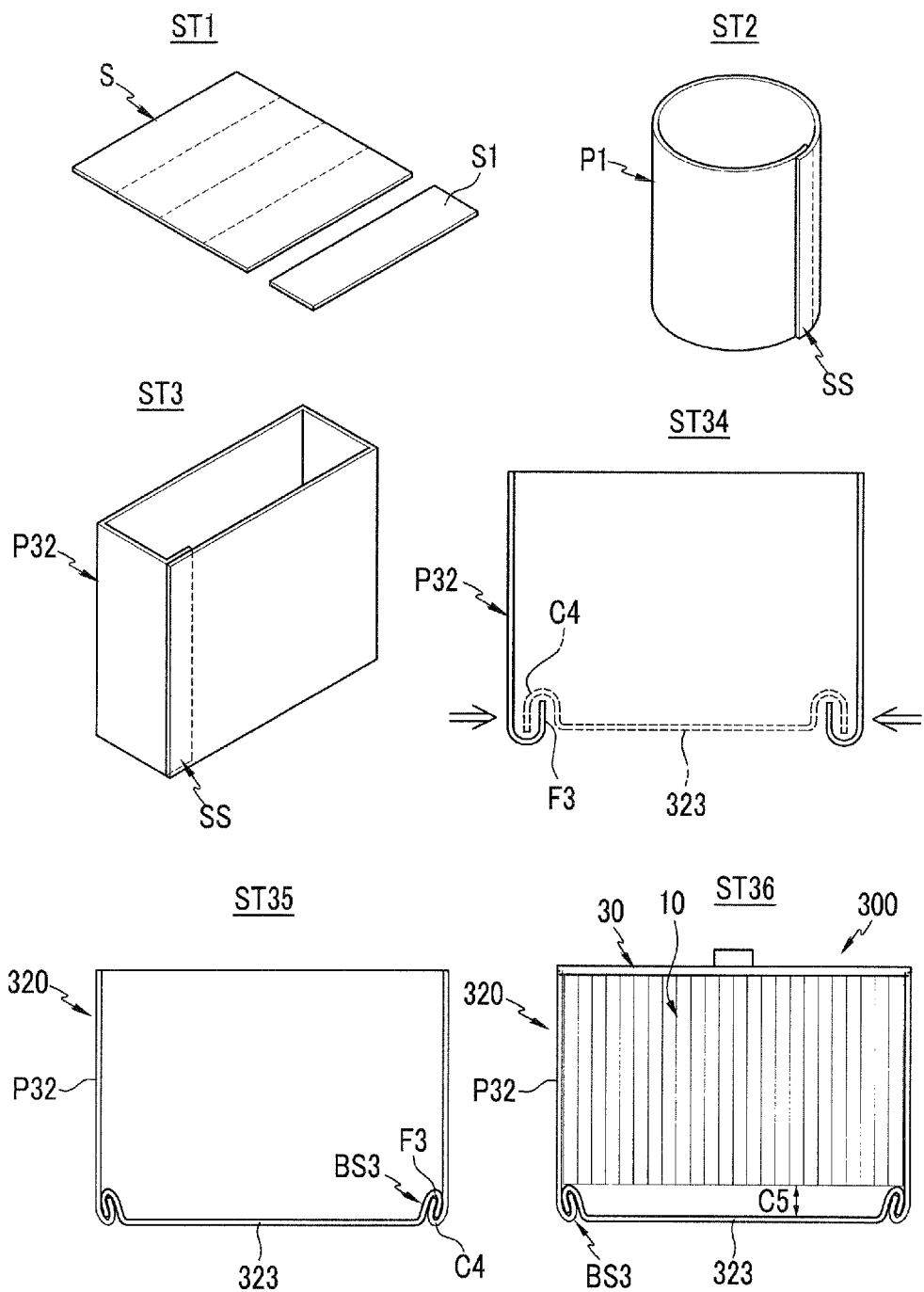
FIG. 10 shows a manufacturing method of a rechargeable battery in order of procedure according to the third exemplary embodiment.
Figure 11:
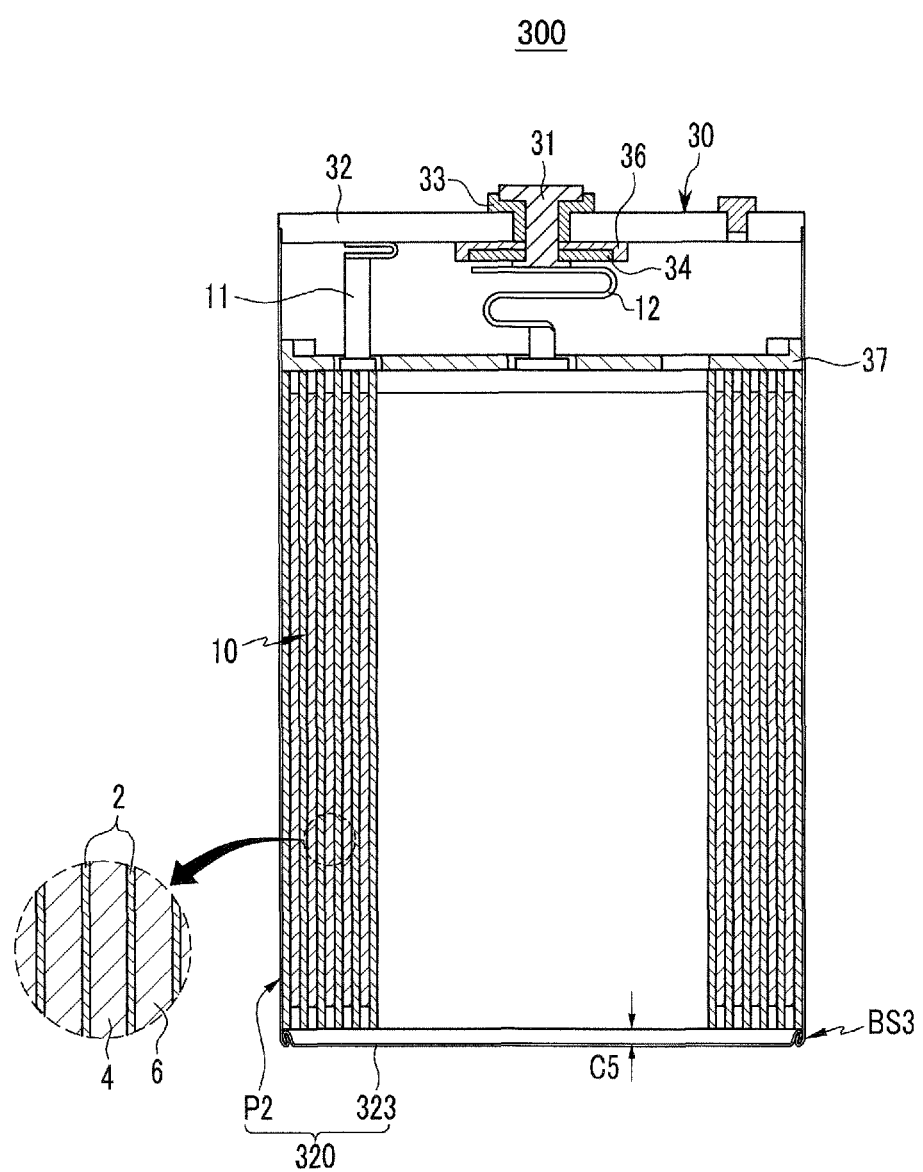
FIG. 11 is a cross-sectional view of a rechargeable battery according to the third exemplary embodiment.

FIG. 10 shows a manufacturing method of a rechargeable battery in order of procedure according to the third exemplary embodiment, and FIG. 11 is a cross-sectional view of a rechargeable battery according to the third exemplary embodiment. When explaining FIG. 10 and FIG. 11, the description of the same configurations as of FIG. 1 to FIG. 3 is omitted.

For example, a manufacturing method of a rechargeable battery 300 according to the third exemplary embodiment includes a slitting step ST1, a forming/side-seaming step ST2, a forming step ST3, a necking/flanging step ST34, a bottom seaming step ST35, and an inserting/combining step ST36.

The necking/flanging step ST34 including deforming one end portion of the rectangular pipe P32, for example, the lower end portion, to form the flange F3. For example, the necking/flanging step ST34 may include folding the flange F3 to the inside from one end portion of the pipe P32 thereby directing it toward the other end portion.

The bottom-seaming step ST35 may include folding and bonding the flange F3 of the pipe P32 and the curl C4 of a bottom plate 323 to form the bottom seam portion BS3. Accordingly, the pipe P32 and the bottom plate 323 are formed into a can 320 applied to the rechargeable battery 300. The can 320 has the bottom seam portion BS3.

The flange F3 may be folded from the end portion of the pipe P32 to the inside thereby directing it toward the other end portion such that the bottom-seaming step ST35 includes forming the bottom seam portion BS3 where the curl C4 of the bottom plate 323 and the flange F3 are bonded inside the can 320. That is, the bottom seam portion BS3 protrudes into the can 320.

The inserting/combining step ST36 may include inserting the electrode assembly 10 connected to the cap assembly 30 into the can 320 and combining the cap assembly 30 to the can 320. The bottom seam portion BS3 protrudes into the inside of the can 320 such that the electrode assembly 10 that is close to and inserted into the inner surface of the can 320 is supported by the bottom seam portion BS3. That is, a space having the interval C5 is formed between the electrode assembly 10 and the bottom plate 323.

In the rechargeable battery 300 of the third exemplary embodiment, the space formed by the interval C5 may further increase the contact area between the electrode assembly 10 and the electrolyte solution compared to the space formed by the interval C1 in the rechargeable battery 100 of the first exemplary embodiment. Accordingly, the heat radiating performance of the rechargeable battery 300 according to the third exemplary embodiment may be further improved.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery, comprising:
    an electrode assembly formed by depositing/spiral-winding a positive electrode and a negative electrode on respective surfaces of a separator;
    a can including a pipe having a side seam portion to enclose the electrode assembly and a bottom plate bonded to a first opening of the pipe by a bottom seam portion to close and seal the first opening and facing an end portion of the electrode assembly, said pipe includes a pair of narrow surfaces facing each other and a pair of wide surfaces facing each other, said narrow surfaces have a shorter width than said wide surfaces, the electrode assembly includes a plane portion facing the pair of wide surfaces, and a convex portion facing the pair of narrow surfaces, said pipe having a bent portion attached directly to said side seam portion;
    a cap assembly bonded to a second opening of the pipe formed at the other side of the bottom plate to close and seal the second opening; and
    a plurality of inserting members consisting of four inserting members inserted into spaces formed between a corner vertically connecting the wide surface and the narrow surface of the pipe and the convex portion of the electrode assembly, each of the plurality of inserting members includes a concave portion entirely in direct contact with a portion of the convex portion of the electrode assembly, each of the plurality of inserting members includes a first plane portion in direct contact with the narrow surface of the pipe, and each of the plurality of inserting members includes a second plane in direct contact with the wide surface of the pipe, said concave portion shape has a concave shape and said convex portion has a convex shape, no space, void or cavity exists between the pipe and the electrode assembly, the plurality of inserting members is in direct physical contact with solely said separator of the electrode assembly and not in contact with the positive or negative electrode of the electrode assembly,
    wherein solely one of the four inserting portions consists of first and second sub-plane portions, said second sub-plane portion is in direct contact with solely the wide surface of the pipe and the first sub-plane is in direct contact with solely the bent portion of the pipe, the first and second sub-plane portions form a step that has a same shape, depth and width as the bent portion, said bent portion inserts into said step.

2. The rechargeable battery of claim 1, wherein the bottom plate is formed of a rectangular plate bonded to end portions of the narrow surfaces and the wide surfaces.

3. The rechargeable battery of claim 2, wherein the plurality of inserting members are formed vertical with respect to the first plane portion.

4. The rechargeable battery of claim 2, wherein the side seam portion is formed by overlapping and seam-welding the bent portion that is bent toward the wide surface from the narrow surface with the end portion of the wide surface in the corner of the pipe.

5. The rechargeable battery of claim 1, wherein the bottom seam portion is formed by rolling and bonding a flange formed at an end portion of the pipe and a curl of the bottom plate, and is formed at a lower end portion corresponding to an inner part of the pipe.

6. The rechargeable battery of claim 5, wherein the electrode assembly forms a space with the bottom plate and is supported by the bottom seam portion.

7. The rechargeable battery of claim 1, wherein the bottom seam portion is formed by rolling and bonding a flange formed at the end portion of the pipe and a curl of the bottom plate, and is positioned outside the pipe.

8. The rechargeable battery of claim 7, wherein the electrode assembly is supported by the bottom plate.

9. The rechargeable battery of claim 1, wherein the bottom seam portion is formed by folding a flange formed at an end portion of the pipe and a curl of the bottom plate, and is positioned at a lower end portion to the inside of the pipe.

10. The rechargeable battery of claim 9, wherein the electrode assembly forms a space with the bottom plate and is supported by the bottom seam portion.

11. A method for manufacturing a rechargeable battery, comprising:
    slitting a metal sheet into a unit sheet of a predetermined size;
    forming the unit sheet into a pipe of a cylinder having a side seam portion by rolling the unit sheet, and overlapping and bonding both ends of the unit sheet, said pipe having a bent portion attached directly to said side seam portion;
    forming the cylinder pipe into a rectangular pipe, said rectangular pipe includes a pair of narrow surfaces facing each other and a pair of wide surfaces facing each other, said narrow surfaces have a shorter width than said wide surfaces;
    forming a flange by deforming one end portion of the rectangular pipe;
    forming a can of a rechargeable battery having a bottom seam portion where the flange and the curl of the bottom plate are bonded;
    inserting an electrode assembly having a positive electrode, negative electrode and separator into the can and combining a cap assembly to the can by connecting the cap assembly to the electrode assembly, said electrode assembly includes a plane portion facing the pair of wide surfaces, and a convex portion facing the pair of narrow surfaces; and
    inserting a plurality of inserting member consisting of four inserting members inserted into spaces formed between a corner vertically connecting the wide surface and the narrow surface of the pipe and the convex portion of the electrode assembly, each of the plurality of inserting members includes a concave portion entirely in direct contact with a portion of the convex portion of the electrode assembly, each of the plurality of inserting members includes a first plane portion in direct contact with the narrow surface of the pipe, and each of the plurality of inserting members includes a second plane in direct contact with the wide surface of the pipe, said concave portion shape has a concave shape and said convex portion has a convex shape, no space, void or cavity exists between the rectangular pipe and the electrode assembly, the plurality of inserting members is in direct physical contact with solely said separator of the electrode assembly and not in contact with the positive or negative electrode of the electrode assembly, wherein solely one of the four inserting portions consists of first and second sub-plane portions, said second sub-plane portion is in direct contact with solely the wide surface of the pipe and the first sub-plane is in direct contact with solely the bent portion of the pipe, the first and second sub-plane portions form a step that has a same shape and size as the bent portion.

12. The method of claim 11, wherein the forming a flange includes forming the flange to be narrow at the one end portion of the rectangular pipe.

13. The method of claim 12, wherein the forming a can includes forming the bottom seam portion formed by rolling the flange and the curl at a lower end corresponding to the inside of the can.

14. The method of claim 13, wherein the inserting the electrode assembly into the can and combining the cap assembly to the can includes supporting one end of the electrode assembly to the bottom seam portion.

15. The method of claim 11, wherein the forming a flange includes forming the flange to be wide at the one end portion of the rectangular pipe.

16. The method of claim 15, wherein the forming a can includes forming the bottom seam portion formed by rolling the flange and the curl outside the can.

17. The method of claim 16, wherein the inserting the electrode assembly into the can and combining, the cap assembly to the can includes supporting one end of the electrode assembly by the bottom plate.

18. The method of claim 11, wherein the forming a flange forms the flange by folding the flange from one end portion of the rectangular pipe to the inside thereby being directed toward the other end portion.

19. The method of claim 18, wherein the forming a can forms the bottom seam portion formed by folding the flange and the curl of the bottom plate inside the can.

\* \* \* \* \*